United States Patent
Yrjana

(10) Patent No.: US 6,370,232 B1
(45) Date of Patent: *Apr. 9, 2002

(54) PROCEDURE AND SYSTEM FOR ENSURING EMERGENCY COMMUNICATION

(75) Inventor: Martti Yrjana, Tupos (FI)

(73) Assignee: Nokia Netwlrks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/208,089

(22) Filed: Dec. 9, 1998

Related U.S. Application Data

(63) Continuation of application No. PCT/FI97/00365, filed on Jun. 10, 1997.

(30) Foreign Application Priority Data

Jun. 13, 1996 (FI) ................................................. 962465

(51) Int. Cl.$^7$ .............................................. H04M 11/04
(52) U.S. Cl. .............................. 379/37; 379/45; 379/37; 370/522
(58) Field of Search .............................. 379/32, 27, 37, 379/45, 207, 232; 370/522, 410, 216

(56) References Cited

U.S. PATENT DOCUMENTS

| | | | |
|---|---|---|---|
| 5,142,571 A | | 8/1992 | Suzuki et al. |
| 5,404,350 A | * | 4/1995 | DeVito et al. ................. 379/45 |
| 5,418,776 A | | 5/1995 | Purkey et al. |
| 5,454,025 A | * | 9/1995 | Mulrow et al. ................ 379/45 |
| 5,509,065 A | | 4/1996 | Fitzgerald |
| 5,781,623 A | | 7/1998 | Khakzar |
| 5,848,070 A | | 12/1998 | Durvaux et al. |
| 6,252,955 B1 | * | 6/2001 | Antila et al. ................. 370/522 |
| 6,278,688 B1 | * | 8/2001 | Suutari et al. ............... 370/522 |

FOREIGN PATENT DOCUMENTS

| | | |
|---|---|---|
| DE | 44 22 805 | 11/1995 |
| EP | 0 337 163 | 10/1989 |
| EP | 0 730 389 | 9/1996 |

* cited by examiner

Primary Examiner—Stella Woo
Assistant Examiner—Melur Ramakrishnaiah
(74) Attorney, Agent, or Firm—Altera Law Group, LLC

(57) ABSTRACT

The present invention relates to data communication networks. In particular, the present invention relates to a procedure and a system for ensuring emergency communication in a data communication network in which the terminal devices (4a, 4a, 4c) are connected to a telephone exchange (1) via an access node (3) consistent with the V5 standard. In the procedure of the invention, emergency communication by a subscriber in the event of a failure of the V5 interface used by the subscriber is ensured by using an emergency V5 interface (6) created in the access node and a reange of addresses created for this purpose in the telephone exchange.

9 Claims, 2 Drawing Sheets

PROCEDURE AND SYSTEM FOR ENSURING EMERGENCY COMMUNICATION

This Application is a continuation of PCT/FI97/00365 filed Jun. 10, 1997.

FIELD OF THE INVENTION

The present invention relates to data communication networks. In particular, the present invention relates to a procedure for ensuring emergency communication in an access network or access node connected to a data communication network and having a number of subscriber lines connected to it for the connection of subscriber

DESCRIPTION OF RELATED ART

There are at least two commonly known methods for connecting subscribers to a local exchange in a data communication network. In the first method, the subscriber is connected via a subscriber line directly to the local exchange or to an access module connected to it. In the second method, the subscriber is connected to an access network, whose access node is connected to the exchange.

Open interfaces (V5.1 and V5.2) between an access network and a local exchange are defined in the ETSI (European Telecommunications and Standards Institute) standards of the ETS 300 324 and ETS 300 347 series. V5 interfaces enable subscribers belonging to a physically separate access network to be connected to a telephone exchange using a standard interface. In this application, V5 interface refers in particular to a dynamic concentrator interface (V5.2) consistent with the standards ETS 300 347-1 and 347-2, which consists of one or more (1–16) PCM (Pulse Cone Modulation) cables. One PCM cable comprises 32 channels, each of which with a transfer rate of 64 kbit/s, i.e. 2048 kbit/s in all. The V5.2 interface supports analogue telephones as used in the public telephone network, digital, such as ISDN (Integrated Services Digital Network) basic and system subscriptions as well as other analogue or digital terminal equipment based on semi-fixed connections.

The terminal equipment can be connected to the access ports of the access node. One or more V5 interfaces can be connected to he access node. The access ports are created in the V5 interface by linking an unambiguous address of each port with a given address of the V5 interface. In the local exchange, this address is created as a V5 subscriber. In other words, each access port has an address which is linked with a V5 address and uses a given time slot or given time slots for signalling to the local exchange.

The objective in ensuring emergency communication is to make sure that calls to emergency numbers of subscribers connected to an access node can be set up even when the V5 interface between the access node and the telephone exchange is out of order. The V5.x standards contain no definition of systems for ensuring emergency communication in case of failure. In this situation, the problem is that, at present, all communication, including emergency communication, via a specific V5 interface of a given subscriber is hindered when the V5 interface fails.

One possibility for ensuring emergency communication in case of failure of a V5 interface assigned to a subscriber is to create in the telephone exchange to which the V5 interface is connected a separate emergency address for each subscriber for communication during the failure situation. However, the problem with this system is the high capacity required in the exchange, because in this case the exchange must have a double subscriber address range as compared with the number of subscribers. In addition, such an arrangement would significantly increase the size of the interface database of the access node.

SUMMARY OF THE INVENTION

The object of the present invention is to present a new type of a procedure and system for ensuring emergency communication in the event of a failure of the V5 interface between an access node and a local exchange. A further object of the present invention is to present a system which does not require an oversized capacity in the exchange connected to the access node.

As for the features characteristic of the invention, reference is made to the claims.

In the procedure of the present invention for ensuring emergency communication in a data communication network comprising a number of telephone exchanges interconnected via trunk cables, the data communication network comprises an access node which is connected to at least one of the exchanges. Connected to the access node, preferably via subscriber cables, are a number of terminal devices used by subscribers to set up connections over the data communication network. Further, in the procedure of the invention, signalling according to the V5 standard, which is defined in the standards mentioned above, is used in the connection between the access node and the telephone exchange, which is a V5 interface consistent with the standard.

In the procedure of the invention for ensuring emergency communication, in the access node is created a separate V5 interface with no subscribers connected to it and comprising a number of V5 subscriber addresses created in the access node. These subscriber addresses are not assigned permanently to any subscriber. The separate V5 interface with no subscribers connected to it is generally created in conjunction with the installation and start-up of the access node. The separate V5 interface is an interface that in a normal situation is not used for the switching of voice or data communication of any subscriber. In the telephone exchange to which this separate V5 interface is connected, a few permanent subscriber addresses have been created for this V5 interface, although in the access node these V5 interface addresses have not been created permanently in the subscriber-line interfaces. Further, according to the invention, in the event of failure of the V5 interface used by a subscriber, a new V5 subscriber address is allocated for the subscriber from the set of V5 subscriber addresses of the separate V5 interface. The set of subscriber. addresses of the separate V5 interface consists of a number of subscriber addresses that can be used when necessary to handle the communication of any one of the subscribers connected to the access node concerned. A failure situation occurs when a subscriber's signalling connection to the telephone exchange fails. Further, subscriber connections are set up using a V5 subscriber address, which is released after the call is disconnected.

As compared with prior art, the present invention has the advantage that, using the procedure of the invention, emergency communication of subscribers connected to an access node can be effectively and reliably guaranteed even in the event of a failure of the V5 interface used by the subscriber. A further advantage of the invention is that it makes it unnecessary to reserve a double number of V5 addresses in the exchange to ensure successful emergency communication of V5 subscribers in a failure situation.

In an embodiment, the separate V5 interface is connected to a different telephone exchange than the other V5 interfaces of the access node. This is advantageous because in this case the connection of this interface is very likely to run along a physically different route, e.g. in a different cable trench than the other V5 interfaces of the access node. A further advantage of this arrangement is that a failure of the exchange to which the other V5 interfaces are connected is not likely to cause a failure of the separate emergency V5 interface as it is connected to a different exchange.

In a preferred embodiment of the present invention, a connection setup request given by a subscriber is monitored in the telephone exchange and, based on this monitoring, connection setup using a V5 subscriber address of the separate V5 interface is prevented if it is detected that the connection is intended for communication other than emergency communication. In a further preferred case, the first free V5 subscriber address in the set of V5 subscriber addresses of the separate V5 interface is reserved for the subscriber. This arrangement ensures that the emergency interface will not be used for communication other than emergency communication. Thus, in a failure situation, when the emergency interface is in operation, its whole capacity can be used for emergency communication. In a preferred case, the connection set up is a call set up between two terminal devices, and the emergency communication consists of an emergency call, alarm message, alarm call or the like.

According to the invention, the access node comprises a separate V5 interface having no subscribers connected to it and comprising a number of V5 subscriber addresses and means for reserving for the subscriber a new V5 subscriber address from the set of V5 subscriber addresses of the separate V5 interface in a failure situation of the V5 interface used by the subscriber. The means for reserving a new V5 subscriber address for the subscriber are preferably implemented by using the program segments of the access node. In the system of the invention, the separate V5 interface is preferably connected to a different telephone exchange than the other V5 interfaces of the access node.

In a preferred embodiment of the present invention, the system comprises means for monitoring the subscriber's connection setup request in the telephone exchange and, based on the monitoring, the system prevents connection setup if it is detected that the connection is intended for communication other than emergency communication. The monitoring can be implemented using components existing in the telephone exchange, of which at least the push-button dialling receivers and the central control unit can be used.

BRIEF DESCRIPTION OF THE DRAWINGS

In the following, the invention is described by the aid of a few examples of its embodiments by referring to the attached drawing, in which.

DETAILED DESCRIPTION OF THE INVENTION

Figure 1:
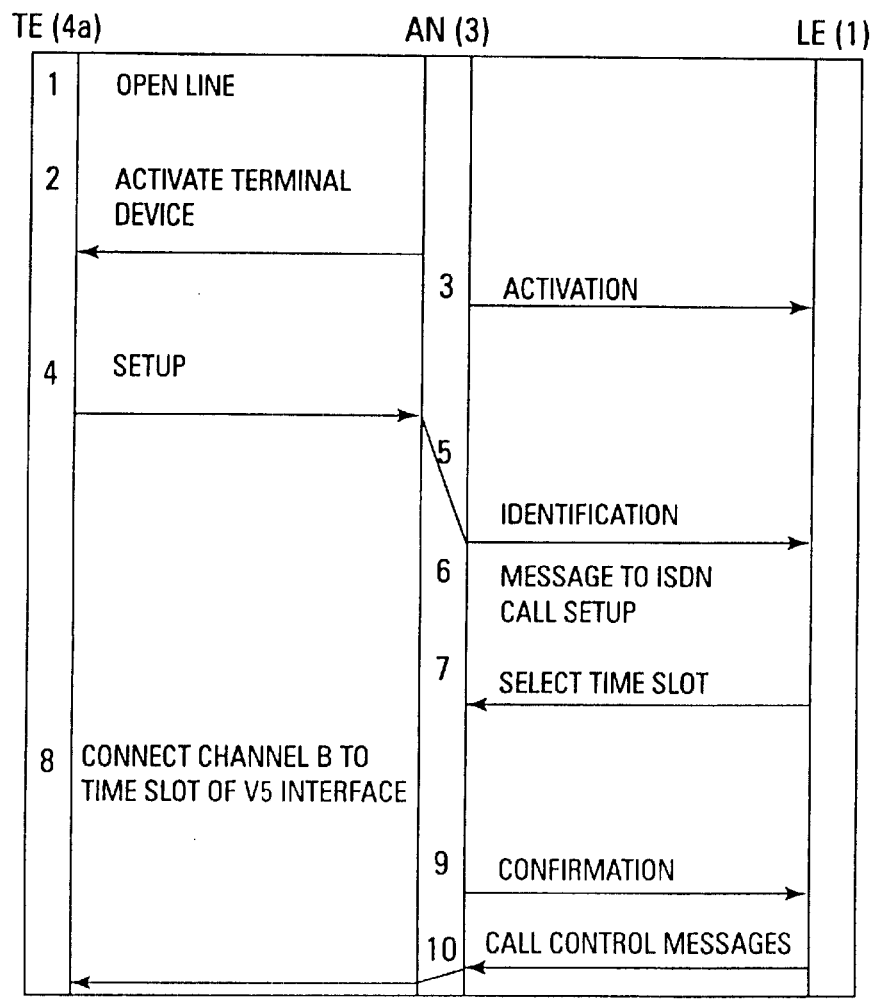
FIG. 1 presents a prior-art signalling arrangement for a normal call over a V5 interface.

FIG. 1 presents an example of the signalling in the case of a prior-art ISDN call over a V5 interface. When the subscriber picks up the headphone (step 1), LAPD signalling (data link layer protocol in ISDN channel D) is started. The access node (AN) 3 activates the terminal device (step 2) and sends a message indicating activation of the terminal device to the telephone exchange (LE) 1 (step 3), using the control protocol. Once activated, the terminal device 4c sends a SETUP message over channel D of the subscriber cable. On receiving the SETUP message, the access node identifies (step 5) the corresponding V5 interface and the V5 subscriber address of the subscriber cable (which in fact is a third-layer address, L3 address, consistent with the OSI architecture (Open Systems Interconnection)) on the basis of the subscriber cable. Moreover, the access node adds a V5 header to the SETUP message and sends it via the Ds channel of the corresponding V5 interface to the telephone exchange 1. The LAPD signalling itself is passed as such over the V5 interface via the signalling channel reserved for the subscriber. Thus, the V5 interface software in the access node 3 does not interfere with the contents of messages in any way. In the telephone exchange 1, the V5 header is removed (step 6) and the SETUP message is transmitted further to an ISDN call setup control stage, where it is terminated. Based on the first SETUP message, the local exchange selects the V5 time slot to be used, and this information is given to the access node 3 together with the L3 address (step 7). The access. node 3 identifies the subscriber cable on the basis of the L3 address received and, via its local group switch, connects (step 8) the B channel of the subscriber cable to the V5 interface time slot reserved for it. Further, the access node 3 sends (step 9) to the telephone exchange 1 a message confirming completion of the connection. The telephone exchange 1 sends the standard ISDN call control messages relating to call setup to the terminal device via the access node over the Ds channel reserved for the subscriber cable (step 10).

Figure 2:
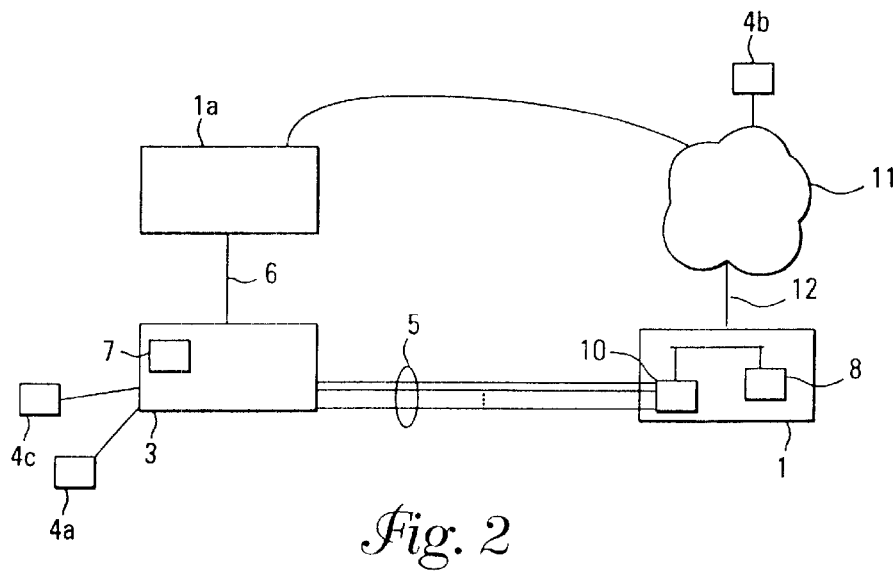
FIG. 2 presents an example of the system of the present invention.

The system of the invention, presented in FIG. 2, comprises a telephone exchange 1, which is part of a data communication network 11. The telephone exchange 1 is linked to the other exchanges in the data communication network via a trunk cable 12. The system represented by FIG. 2 further comprises a number of terminal devices 4a, 4b, 4c, which may be analogue telephones used in the public telephone network, digital, such as ISDN (Integrated Services Digital Network) basic and system connections or analogue or digital terminal equipment based on semi-fixed connections. Via the terminal equipment 4a, 4b, 4c, the users of the data communication network, i.e. the subscribers, set up voice and/or data connections over the data communication network 11.

FIG. 2 further shows a part of the data communication network, i.e. an access node 3 together with subscriber lines, connected as an example to another telephone exchange 11. The access node 3 functions between the telephone exchange 1 and the subscriber 4a, 4c and connects subscribers to the exchange 1 of the data communication network. The access node 3 is connected via a V5.2 interface 5 comprising 1–16 PCM cables (2 Mbit/s) to the exchange terminal (ET) 10 of the telephone exchange 1. The exchange terminal contains the functions required by the V5 interface. The access node also comprises means 7 for allocating a new V5 subscriber address for the subscriber from the set of subscriber addresses of the separate V5 interface in the event of a failure of a connection via the V5 interface used by the subscriber. Generally, the allocation of a new V5 address performed using the access node signalling programmes.

Furthermore, the exchange is provided with means 8 for monitoring the connection setup request given by a subscriber. These means 8 preferably consist of call and usage control technology commonly used in telephone exchanges.

To guarantee successful emergency communication, the access node is provided with at least one extra V5 interface 6 with no subscribers connected to it. This is a kind of emergency V5 interface and it is connected to a different exchange 1a than the other V5 interfaces 5 of the access node 3. Depending on the size of the access node, the V5 interface 6 without subscribers may have a capacity of e.g. 30 subscribers. In the case of a failure of the V5 interface 5 assigned to the subscriber, a new V5 subscriber address, which is associated with the emergency V5 interface connected to exchange 1a, is reserved for the subscriber.

As there are no subscribers assigned to V5 interface 6, it can be used to connect as many calls as its capacity permits, if necessary. Since, according to the invention, call setup from a subscriber line is monitored by the telephone exchange in a situation where V5 interface 5 has failed, use of the emergency interface 6 can be prevented as soon as it is detected that the interface 6 is being used for communication other than emergency communication.

Figure 3:
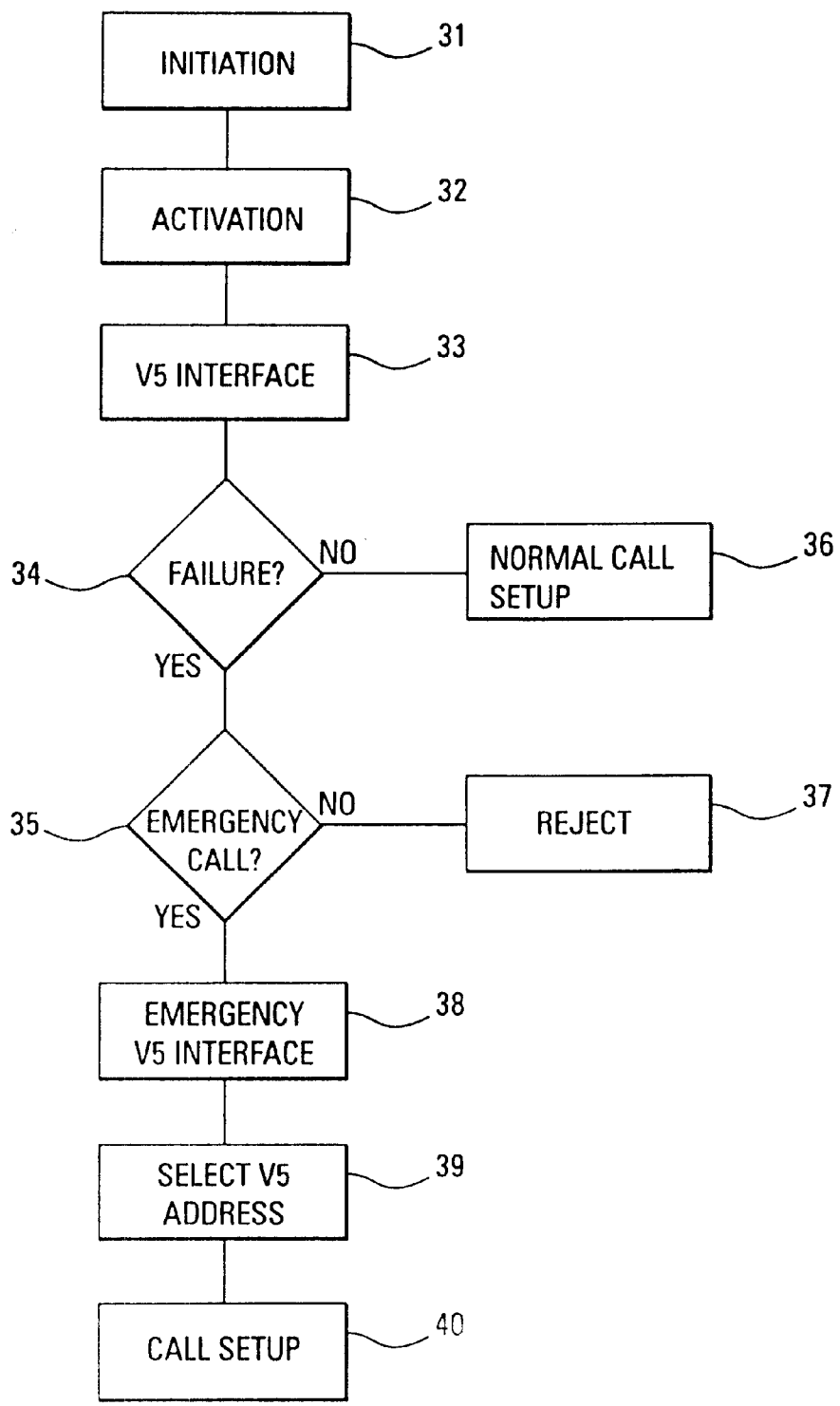
FIG. 3 is a flowchart representing call setup according to an embodiment of the present invention.

Referring to FIG. 3, a preferred procedure according to the present invention, used in conjunction with call setup, is presented as a flow diagram. The call setup process advances in a stepwise manner as follows. First, the subscriber picks up the headphone, block 31, and this is detected by the access node, which passes corresponding information to the telephone exchange. Next, the terminal device 3 is activated, block 32, as was described above by referring to FIG. 1. In block 33, the V5 interface used by the subscriber is identified, and in block 34 the status of the V5 interface used by the subscriber is monitored, and, based on this monitoring, normal call setup is carried out if no fault is detected in the V5 interface under observation, and if a fault is detected, then a check is performed to establish whether the call is an emergency call, block 35. If it is, then the emergency V5 interface is used for call setup and the process is continued according to the present invention by selecting a free V5 subscriber address, block 39, and using this address for the call setup, block 40. If the monitoring function in block 35 indicates that the call is not an emergency call, the call attempt is rejected, block 37. In this case, the subscriber can be given a notice or other signal.

The invention is not restricted to the examples of its embodiments described above, but many variations are possible within the framework of the inventive idea defined by the claims.

What is claimed is:

1. Procedure for ensuring emergency communication in a data communication network comprising a number of telephone exchanges interconnected via trunk cables and an access node which is connected to at least one of the exchanges and to which are connected a number of terminal devices used by subscribers to set up connections via the data communication network, in which procedure signalling according to the V5 standard is used in the connection between the access node and the telephone exchange, which connection is an access node V5 interface consistent with the V5 standard, wherein in the event of a failure of the V5 interface used by the subscriber, a new V5 subscriber address is allocated for the subscriber from a set of V5 subscriber addresses created beforehand in the access node for a separate V5 interface with no subscribers connected to it;

this new V5 subscriber address is used for connection setup; and the V5 subscriber address is released after disconnection of the connection.

2. Procedure as defined in claim 1, wherein the separate V5 interface without subscribers is connected to a different telephone exchange than the other V5 interfaces of the access node.

3. Procedure as defined in claim 1, wherein a connection setup request given by a subscriber is monitored in the telephone exchange and, based on this monitoring, connection setup using a V5 subscriber address of the separate V5 interface is prevented if it is detected that the connection is intended for communication other than emergency communication.

4. Procedure as defined in claim 1, wherein a first free V5 subscriber address in the set of V5 subscriber addresses of the separate V5 interface is allocated to the subscriber.

5. Procedure as defined in claim 4, wherein the connection set up is a call set up between two terminal devices; and that the emergency communication is an emergency call.

6. Procedure as defined in claim 4, wherein the emergency communication is an automatic alarm message, an alarm call or the like.

7. System for ensuring emergency communication in a data communication network comprising a number of telephone exchanges interconnected via trunk cables and an access node which is connected to at least one of the exchanges and to which are connected a number of terminal devices used by subscribers to set up connections via the data communication network, in which system the connection between the access node and the telephone exchange is implemented using signalling according to the V5 standard, said connection being an access node V5 interface consistent with the V5 standard, wherein the access node comprises a separate V5 interface with no subscribers connected to it, which comprises a set of V5 subscriber addresses; and means for allocating a new V5 subscriber address for the subscriber from the set of V5 subscriber addresses of the separate V5 interface if a connection from the subscriber to the telephone exchange fails to be set up.

8. System as defined in claim 7, the separate V5 interface is connected to a different telephone exchange than the other V5 interfaces of the access node.

9. System as defined in claim 7, wherein the system comprises means permitting a connection setup request given by a subscriber to be monitored in the telephone exchange, and that, based on this monitoring, connection setup using a V5 subscriber address of the separate V5 interface is prevented in the system if it is detected that the connection relates to communication other than emergency communication.

* * * * *